Patented Jan. 25, 1949

2,459,782

UNITED STATES PATENT OFFICE 2,459,782

ANELLATED FLUOROCARBONS

Earl T. McBee, La Fayette, Ind., and Lavon D. Bechtol, Baltimore, Md., assignors to Purdue Research Foundation, West Lafayette, Ind., a corporation of Indiana No Drawing. Application September 24, 1945, Serial No. 618,396

6 Claims. (Cl. 260—648)

This invention relates to a novel group of organic compounds constituted by the saturated perfluorodicarbocyclic anellated compounds in which the number of adjacent shared carbon atoms is two.

We have prepared and have identified several representative members of this group of compounds and have determined certain of their physical constants whereby they may be identified. In general, the compounds are water-white liquids which vaporize at temperatures somewhat above the boiling point of water and possess remarkable stability at elevated temperatures, even in the presence of metals. Their non-flammability and their stability, particularly to heat and oxidation, make them very attractive for technological purposes, particularly as high temperature heat transfer media. Certain of these compounds exhibit lubricating properties.

The compounds may be prepared by the treatment of the desired hydrocarbon with a metal perfluoride at elevated temperatures whereby all of the hydrogen in the compound is replaced with fluorine and any double bonds are saturated with fluorine. The treatment may be carried out, for example, step-wise in vapor phase by passage of the hydrocarbon over a metal perfluoride maintained at progressively increasing temperatures in a plurality of reactors connected in series.

The invention herein is not limited by the process of manufacture or apparatus employed, but is concerned solely with the new group of compounds herein described and claimed.

We will now describe generally a vapor phase reactor system, consisting of five units connected in series and constructed of welded mild steel, in which a number of representative compounds included within the scope of our invention were prepared. Each of the units was surrounded by an electric heater so that each unit could be operated at any desired temperature independent of the other units. The first unit contained four chambers, each one inch in height, eight inches in width, and forty-eight inches in length, arranged for parallel flow of reactants therethrough. The second unit, receiving the reactants from the first unit, contained two chambers arranged in series. The third and fourth units were similar to the second unit and the fifth unit had four chambers in series. Each of the chambers may contain approximately twenty (20) gram-moles of silver difluoride ($AgF_2$). A vaporizer was provided in which the hydrocarbon could be heated to at least its melting point and a source of nitrogen under pressure was arranged so that it could be passed into the molten hydrocarbon, the gases being led into the first unit of the reaction system. A collection train was constructed to receive the gases from the fifth unit of the reaction system. This comprised three copper traps, the first of which was exposed to the air of the room, the second set in ice water, and the third in dry ice. The products collected were accumulated, washed with water, then with dilute aqueous potassium hydroxide, dried over Drierite, and fractionally distilled.

The following examples illustrate the preparation of certain members of this new group of compounds, but are not to be construed as limiting the invention thereto:

Example 1

The preparation of perfluoronaphthalane was accomplished in the apparatus just described, in the following manner:

Four moles (512 grams) of naphthalene was placed in the vaporizer and heated gradually to 200 degrees centigrade. Nitrogen gas was then bubbled through the molten hydrocarbon and the vapors passed into the silver difluoride-containing reactors. The temperature of the reaction zone in the first unit was maintained between 170 degrees and 180 degrees centigrade, the second unit between 205 degrees and 210 degrees centigrade, the third unit between 265 degrees and 270 degrees centigrade, the fourth unit between 280 degrees and 285 degrees centigrade, and the fifth unit between 305 degrees and 320 degrees centigrade. After all the hydrocarbon had been passed into the system, the temperature of the first four units was raised to 300 degrees centigrade and nitrogen gas passed through the system for several hours to insure substantially complete removal of the product. The organic product was collected in the cooled copper traps. Rectification of this crude product, after washing and drying as above described, yielded 3680 grams of perfluoronaphthalane ($C_{10}F_{18}$) boiling at 140 degrees centigrade at 750 millimeters of mercury pressure absolute. The index of refraction of perfluoronaphthalane was 1.312 and the specific gravity was 1.946, both at 20 degrees centigrade. The compound has a freezing point near −10 degrees centigrade.

Example 2

The preparation of perfluoro-1-methylnaphthalane was carried out by introducing four moles (568 grams) of 1-methylnaphthalene at a uniform rate into the above-described reactor system from a dropping funnel over a period of five hours. The temperature of the reactors in this instance was as follows:

The first unit was maintained at about 140 degrees centigrade, the second unit at about 210 degrees centigrade, the third unit at about 270 degrees centigrade, the fourth unit at about 290 degrees centigrade, and the fifth unit at about 305 degrees centrigrade. The temperature of all of the reactors was raised to between 300 and 325 degrees centigrade after all of the 1-methylnaphthalene had been passed into the reactor system, and nitrogen gas was passed through the reactors for several hours to insure substantially complete removal of the product. The product was collected in cooled traps and worked up as described in the preceeding example. The silver difluoride was regenerated in the reactors and the organic product recycled therethrough over a period of four hours, the temperatures of all the reactors being maintained between 300 degrees and 325 degrees centigrade. The colorless liquid product resulting was washed and dried and 850 grams recovered. On rectification, we recovered 520 grams of pure perfluoro-1-methylnapthalane, boiling at 161 degrees centigrade at 757 millimeters of mercury pressure absolute. The refractive index of the compound at 20 degrees centigrade is 1.317 and the liquid did not freeze at −75 degrees centigrade. Specific gravity of the compound was 1.960 at 20 degrees centigrade.

Example 3

The preparation of perfluoro-2-methylnaphthalane was accomplished in the reaction system above-described by bubbling nitrogen gas through 0.6 mole (85 grams) of 2-methylnaphthalene in the vaporizer unit to carry the hydrocarbon into the heated reactors. The various reactor units were maintained at temperatures ranging from 200 degrees centigrade up to 300 degrees centigrade. After all of the hydrocarbon had been passed into the reaction tubes, nitrogen gas was passed through the system for several hours to displace the product. The organic product was collected in cooled copper traps, washed with water, and dried over Drierite. After the silver difluoride had been re-formed in the reactors, this product was recycled through the reactors while they were maintained at a temperature of 320 degrees centigrade. The organic product from the recycle operation was washed with water and potassium hydroxide and then dried over Drierite. Upon rectification, perfluoro-2-methylnaphthalane, to the extent of 102 grams, was recovered from this reaction product. This material boiled at 160 degrees–161 degrees centigrade at 744 millimeters of mercury pressure absolute. Specific gravity and refractive index of the compound at 20 degrees centigrade were 1.963 and 1.316, respectively. The compound does not freeze at −60 degrees centigrade.

Example 4

In a manner similar to that described for the fluorination of 1-methylnaphthalene in Example 2, one mole (116 grams) of indene was perfluorinated at temperatures ranging from 180 degrees to 310 degrees centigrade, followed by a recycle operation at 315 degrees centigrade. After washing with water and potassium hydroxide solution, the organic product was rectified and 135 grams of perfluoroindane recovered, boiling at 116–117 degrees centigrade at 747 millimeters of mercury pressure absolute. Specific gravity of the compound is 1.884 and the refractive index is 1.303, both at 20 degrees centigrade. The compound freezes at about −15 degrees centigrade.

Example 5

One mole (156 grams) of a mixture of dimethylnaphthalenes were treated in the manner described in Example 1 at temperatures in the range between 150 degrees and 300 degrees centigrade. The organic product was recycled with all of the reactors at temperatures of 320 degrees centigrade. Perfluorodimethylnaphthalane was recovered from the reaction product, boiling at 177–179 degrees centigrade at atmospheric pressure and having a specific gravity of 1.976 and an index of refraction of 1.320, both at 20 degrees centigrade.

Other methods of preparing the new group of compounds herein described and claimed may be employed. For example, a method which is particularly useful in the preparation of perfluoro compounds of the type herein concerned which are substituted with one or more alkyl radicals, and which has utility only in such cases, comprises at least the partial chlorination of the side chain of an appropriate hydrocarbon and at least the partial replacement of chlorine by fluorine through the use of anhydrous hydrogen fluoride, antimony trifluoride, or other similar fluorinating agents. The hydrogen and any chlorine remaining in the partially fluorinated compound may then be replaced with fluorine through the use of a metal perfluoride such as silver perfluoride ($AgF_2$), cobalt trifluoride ($CoF_3$), lead tetrafluoride ($PbF_4$), et cetera.

Other representative compounds included within the scope of our invention, and which may be prepared according to the procedures herein set forth, are the perfluoro lower-alkyl substituted naphthalanes, such as perfloro-1-ethylnaphthalane, perfluoro-1-isopropylnaphthalane, perfluoro-2-n-octylnaphthalane, and similar perfluoro polyalkyl substituted compounds. Our invention is particularly concerned with the saturated perfluorodicarbocyclic anellated compounds in which the number of adjacent shared carbon atoms is two and wherein at least one ring contains six carbon atoms.

We claim:

1. A saturated alkyl-substituted dicarbocyclic anellated fluorocarbon containing from 9 to 18 carbon atoms, inclusive, in which the number of adjacent shared carbon atoms is two and wherein both rings contain six carbon atoms, the total number of carbon atoms in the rings being ten.
2. A saturated dicarbocyclic anellated fluorocarbon containing from 9 to 18 carbon atoms, inclusive in which the number of adjacent shared carbon atoms is two and wherein both rings contain six carbon atoms, the total number of carbon atoms in the rings being ten.
3. A saturated dicarbocyclic anellated fluorocarbon containing from 9 to 18 carbon atoms, inclusive, in which the number of adjacent shared carbon atoms is two and wherein at least one ring contains six carbon atoms, the total number of carbon atoms in the rings being at least 9 and not in excess of 10.
4. Perfluoronaphthalane.
5. Perfluoromethylnaphthalane.
6. Perfluoroindane.

EARL T. McBEE.
LAVON D. BECHTOL.

(References on following page)

REFERENCES CITED

The following references are of record in the file of this patent:

UNITED STATES PATENTS

| Number | Name | Date |
|---|---|---|
| 2,013,030 | Calcott et al. | Sept. 3, 1935 |

FOREIGN PATENTS

| Number | Country | Date |
|---|---|---|
| 429,591 | Great Britain | May 28, 1935 |

OTHER REFERENCES

Zincke et al., "Annalen," vol. 367, page 12, (1909).

Simons et al., "J. A. C. S.," vol. 61, pages 2962–6 (1939).

Fukuhara et al., "J. A. C. S.," vol. 63, pages 2792–5 (1941).

Ruff et al., "Zeit. anorg. allgem. Chem.," vol. 192, pages 249–256 (1930).